(12) United States Patent
Luo

(10) Patent No.: US 11,959,293 B2
(45) Date of Patent: Apr. 16, 2024

(54) ROTARY UMBRELLA SEAT FOR AN UMBRELLA

(71) Applicant: Xiong Luo, Nantong (CN)

(72) Inventor: Xiong Luo, Nantong (CN)

( * ) Notice: Subject to any disclaimer, the term of this patent is extended or adjusted under 35 U.S.C. 154(b) by 212 days.

(21) Appl. No.: 17/755,031

(22) PCT Filed: Jan. 16, 2020

(86) PCT No.: PCT/CN2020/072346
§ 371 (c)(1),
(2) Date: Apr. 19, 2022

(87) PCT Pub. No.: WO2021/098037
PCT Pub. Date: May 27, 2021

(65) Prior Publication Data
US 2022/0389732 A1 Dec. 8, 2022

(30) Foreign Application Priority Data
Nov. 20, 2019 (CN) .......................... 201922016648.9

(51) Int. Cl.
*E04H 12/22* (2006.01)
*A45B 23/00* (2006.01)
*F16M 11/10* (2006.01)

(52) U.S. Cl.
CPC .............. *E04H 12/22* (2013.01); *F16M 11/10* (2013.01); *A45B 2023/0012* (2013.01)

(58) Field of Classification Search
CPC . E04H 12/22; E04H 12/2276; E04H 12/2284; E04H 12/2238; F16M 11/10; A45B 2023/0012
See application file for complete search history.

(56) References Cited

U.S. PATENT DOCUMENTS

| 9,957,728 | B2 * | 5/2018 | Ma | A45B 23/00 |
| 2001/0040208 | A1 * | 11/2001 | Li | E04H 12/2238 248/519 |
| 2010/0206346 | A1 * | 8/2010 | Tung | A45B 23/00 135/20.1 |

FOREIGN PATENT DOCUMENTS

| CN | 2600685 Y | * | 1/2004 | F16M 11/04 |
| CN | 109043759 A | * | 12/2018 | A45B 23/00 |

* cited by examiner

*Primary Examiner* — Brian D Mattei
*Assistant Examiner* — Omar F Hijaz
(74) *Attorney, Agent, or Firm* — Wang Law Firm, Inc.

(57) ABSTRACT

A rotary umbrella seat for an umbrella comprises a rotary base (1), a sleeve welding piece (2) and a pedal component (3); wherein the sleeve welding piece (2) comprises a sleeve (21) connected to a base plate (22); a lower end of a column (20) of the umbrella is slid over the sleeve (21) and rest on the rotary base (1); the pedal component (3) comprises a pedal (31) connected to a pedal shaft (32); the base plate (22) has a plurality of positioning holes (221), the pedal shaft (32) is disengaged from the base plate (22) when the pedal is pressed down, the pedal shaft is engaged to the rotary base when the pedal is released. The present invention is simple in structure, easy to operate, stable and reliable to use, and can easily realize the rotation of the seat and adjust the position of the umbrella, so it is worth popularizing.

8 Claims, 4 Drawing Sheets

ROTARY UMBRELLA SEAT FOR AN UMBRELLA

TECHNICAL FIELD OF THE INVENTION

The present invention relates to the technical field of umbrellas, and relates to a seat for an umbrella, particularly to a rotary umbrella seat.

BACKGROUND OF THE INVENTION

As a kind of outdoor leisure items, umbrellas are widely applied in squares, beaches, parks, gardens or similar places to shield an individual from sun.

The existing seats for umbrellas are in various forms and made of various materials. In order to maintain the balance between the seat and the canopy, the seat is relatively large or heavy. The seat commonly used at present is a fillable hollow seat body, and a handle insertion hole is formed in the seat body. The whole seat body is integrally formed by plastic injection molding. When in use, fillers such as water or fine sand are filled in the seat to balance the center of gravity of the seat, so that the seat is more stable after the handle is inserted into the seat. However, the seat with this structure is often large, heavy, inconvenient to transport, and high in the cost of manufacturing, packaging and transportation. In addition, the existing seats for umbrellas are fixed and cannot be rotated.

Upon examination, a Chinese Utility Model Patent CN200720052619.2 disclosed an umbrella seat easy to fix a handle, comprising a fillable hollow seat body, wherein a connecting tube is inserted into an insertion hole in the center of the seat body; a handle sleeve is in threaded connection to the end of the connecting tube; the sleeve is of a two-layer structure; a plurality of through slots are formed on the sidewall of the inner-layer sleeve to form an elastic clamp ring; a plurality of threads are formed on the inner wall of the outer-layer sleeve; and, the tapered slope of the connecting tube cooperates with the elastic clamp ring of the handle sleeve to push the elastic clamp ring toward the inner side of the sleeve so as to fold and clamp the handle. The seat can hold handles of different specifications, so that the handle can be prevented from shaking in the hole on the seat body to wear the hole wall and the service life of the seat is prolonged. However, the seat is cumbersome in structure and large in size, and the seat cannot be rotated and thus is not flexible and convenient to use.

SUMMARY OF THE INVENTION

It is an object of the present invention to provide a rotary umbrella seat, which is rational in structure and flexible and convenient to operate.

For achieving the above object, the rotary umbrella seat comprises a rotary base; a sleeve welding piece fitted through the rotary base; and a pedal component attached to the rotary base; wherein, the sleeve welding piece comprises a sleeve connected to a base plate; the sleeve is vertically post disposed in the middle of the base plate; the rotary base is sleeved outside the sleeve and located above the base plate; a lower end of a column of the umbrella is slid over the sleeve and rest on the rotary base; the pedal component comprises a pedal connected to a pedal shaft; the pedal is resetably and rotatably attached to the top of the rotary base; the base plate has a plurality of positioning holes, the pedal shaft passes through the rotary base and is inserted into one of the positioning holes on the base plate, the pedal shaft is disengaged from the base plate when the pedal is pressed down during the rotation of the pedal, the pedal shaft is engaged to the rotary base when the pedal is released.

Preferably, the rotary base is a circular base with a hole formed in the central of the rotary base; the rotary base has a cylindrical boss formed at the hole of the rotary base; the lower end of the sleeve passes through an inner hole of the boss and is fixed to the base plate; a seat tube plug is disposed at the opening position on the top of the sleeve, and a rotary block is sleeved on the upper end of the sleeve; and the rotary block rotates with the column, and is rotatably sleeved on the upper end of the sleeve and is covered by the seat tube plug.

Preferably, the seat tube plug is a cylindrical structure matched with the inner hole of the sleeve; a flange resisted against the upper end face of the sleeve is disposed at the upper end of the seat tube plug, and a connecting pin hole is disposed radially at the lower end of the seat tube plug; a connecting hole is disposed on the sleeve, the seat tube plug is positioned to the sleeve by passing a limiting pin through the connecting hole and the connecting pin hole; an extension portion resisted against the lower end of the rotary block for limiting is disposed at the outer end of the limiting pin; and the rotary block is rotatably sleeved on the sleeve and is limited between the limiting pin and the flange of the seat tube plug.

Preferably, two mounting plates for mounting the pedal are disposed on the upper end of the rotary base, and one mounting hole is disposed close the outer ends of each mounting plate; two connecting lugs matched with the mounting plates are disposed at the lower end of the pedal, and two inner and two outer connecting holes are disposed on the connecting lugs; the outer connecting holes correspond to the mounting holes of the mounting plates; the pedal is capable of being rotatably mounted on the rotary base by passing a rotating shaft through the mounting holes of the mounting plates and the outer connecting holes of the connecting lugs; and a spring member capable of resetting the pedal is disposed between the pedal and the rotary base.

Preferably, a through hole for receiving the pedal shaft is longitudinally formed at a position, close to the inner side, in the middle of the rotary base between the two mounting plates; a pin hole is radially disposed at the upper end of the pedal shaft; the upper end of the pedal shaft is inserted between the two connecting lug of the pedal, and has a certain distance to the bottom of the pedal; the upper end of the pedal shaft is connected to the connecting lugs by passing a cylindrical pin through the inner connecting hole of the connecting lug, the pin hole and the connecting hole of the connecting lug on the other side; the plurality of positioning holes corresponding to the through hole of the rotary base for receiving and positioning the lower end of the pedal shaft are annularly disposed at intervals on the base plate close to the outer edge; and when the pedal is stepped down, the pedal shaft is driven by the pedal to move up to disengage from the positioning hole, and the rotary base can rotate freely.

Preferably, the spring member is a torsion spring, the torsion spring is sleeved on the rotating shaft; and one end of the torsion spring is supported onto the upper end face of the rotary base, while the other end thereof is supported onto the rear end of the bottom of the pedal.

Preferably, a bent portion bent downward is disposed at the inner end of the pedal; when the pedal is reset, the bent portion is resisted against the upper end face of the rotary base, a protruded portion corresponding to the upper end of the pedal shaft is disposed on the lower end face of the pedal;

when the pedal is stepped down and the pedal shaft is moved upward to disengage from the base plate, the protruded portion is resisted against the upper end of the pedal shaft, so as to limit the pedal when the pedal is stepped down to the largest extent.

Finally, preferably, a groove for receiving the column is disposed on the rotary base along the outer side of the boss, the column is sleeved outside both the boss and the rotary block; the lower end of the column is inserted into the groove of the rotary base for positioning; the boss has the same shape as the rotary block, and a plurality of positioning guide ribs matched with the inner wall of the column are disposed on the outer circumferential surfaces of the boss and the rotary block.

Compared with the prior art, the present invention has the following advantages. By providing the rotary base, the sleeve welding piece and the pedal and inserting the column onto the sleeve welding piece, the sleeve welding piece plays a role in fixation and supporting, the rotary base plays a role in driving the rotation of the column, and the pedal plays a role in engaging or disengaging the rotary base from the sleeve welding piece through the pedal shaft. When in use, the pedal shaft is disengaged from the sleeve welding piece as long as the pedal is stepped down, so that the rotary base can be rotated, and the column is also rotated. After the column is rotated in place, the pedal is released, and the pedal shaft is inserted and positioned into the sleeve welding piece, so that the rotary base is fixed. The present invention is simple in structure, easy to operate, stable and reliable to use, and can easily realize the rotation of the seat so as to adjust the position of the umbrella, so it is worth popularizing.

DETAILED DESCRIPTION OF THE INVENTION

Figure 1:
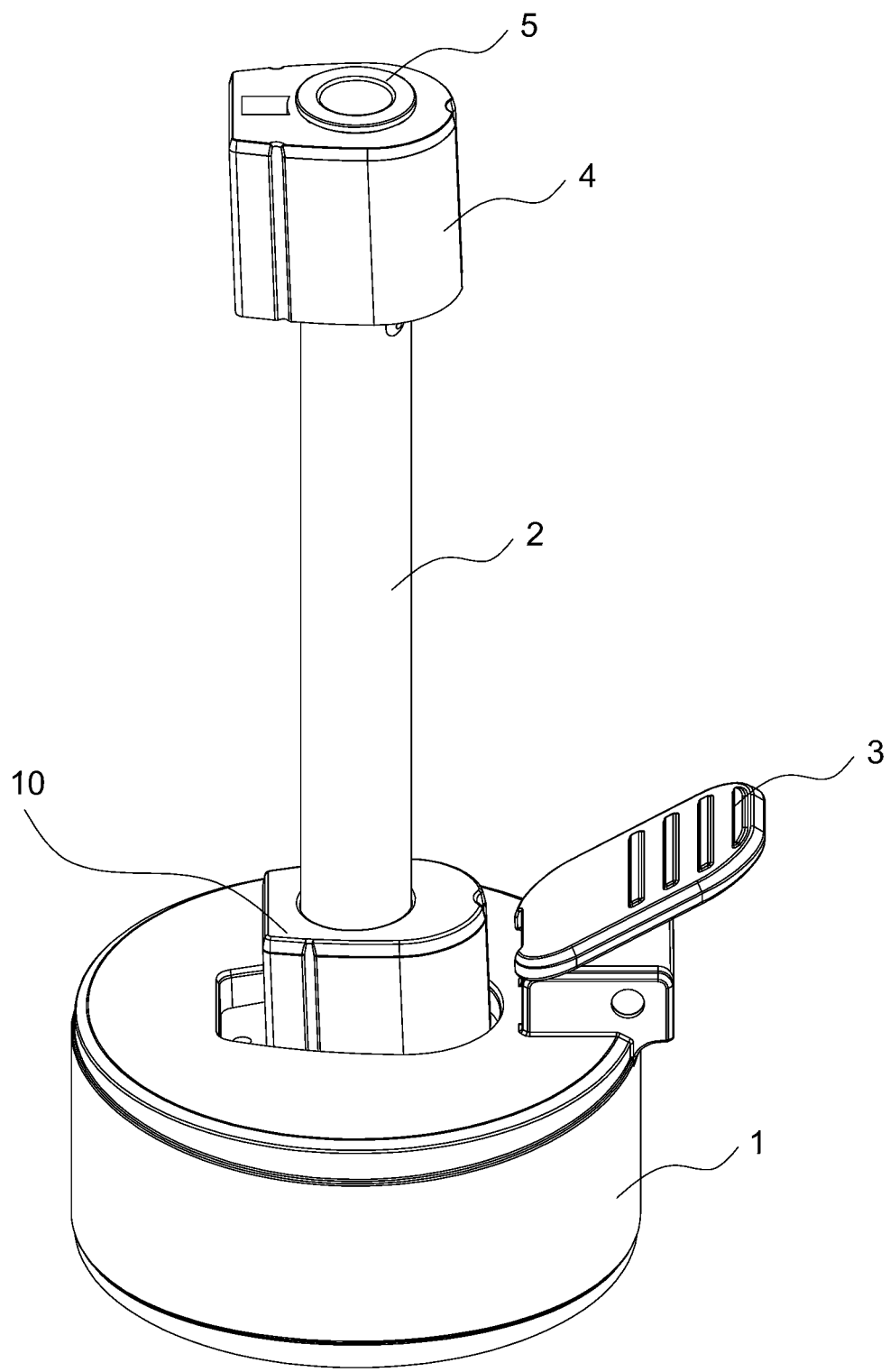
FIG. 1 is a perspective view of a rotary umbrella seat according to an embodiment of the present invention.
Figure 2:
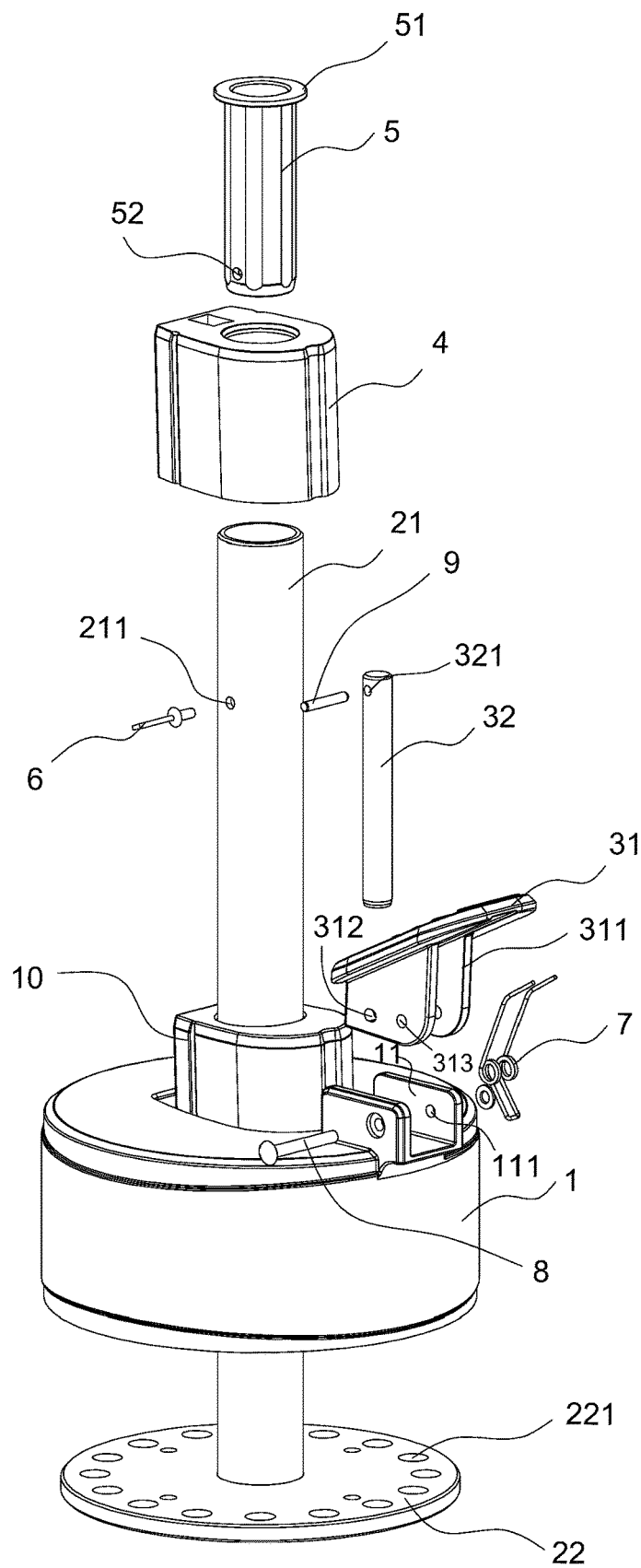
FIG. 2 is an exploded view of FIG. 1.

The present invention will be further described in detail below by embodiments with reference to the accompanying drawings.

As shown in FIGS. 1-4, a rotary umbrella seat comprises a rotary base 1, a sleeve welding piece 2 and a pedal component 3. The sleeve welding piece 2 at least comprises a sleeve 21 and a base plate 22. The sleeve 21 is a hollow tube, and is vertically post disposed in the middle of the base plate 22 to be welded and fixed to the base plate 22. The rotary base 1 is a circular base with a hole formed in its middle. The rotary base 1 is sleeved outside the sleeve 21 and located above the base plate 22; a lower end of a column 20 of the umbrella is slid over the sleeve 21 and rest on the rotary base 1; the pedal component 3 comprises a pedal 31 connected to a pedal shaft 32; the pedal 31 is resetably and rotatably attached to the top of the rotary base 1; the base plate 22 has a plurality of positioning holes 221, the pedal shaft 32 passes through the rotary base 1 and is inserted into one of the positioning holes 221 on the base plate 22, the pedal shaft 32 is disengaged from the base plate 22 when the pedal is pressed down during the rotation of the pedal 31, the pedal shaft is engaged to the rotary base when the pedal is released.

The specific structure will be described below. The rotary base 1 has a cylindrical boss 10 formed at the hole of the rotary base 1; the lower end of the sleeve 21 passes through an inner hole of the boss 10 and is fixed to the base plate 22. A groove for receiving the column 20 is disposed on the rotary base 1 along the outer side of the boss 10. A seat tube plug 5 is disposed at the opening position on the top of the sleeve 21. The seat tube plug 5 is a cylindrical structure matched with the inner hole of the sleeve 21; a flange 51 resisted against the upper end face of the sleeve 21 is disposed at the upper end of the seat tube plug 5. A rotary block 4 is sleeved on the upper end of the sleeve 21, and the rotary block 4 has the same shape as the boss 10. The column 20 is sleeved outside both the boss 10 and the rotary block 4; the lower end of the column 20 is inserted into the groove of the rotary base 1 for positioning. A plurality of positioning guide ribs matched with the inner wall of the column 20 are disposed on the outer circumferential surfaces of the boss 10 and the rotary block 4. Thus, the rotary block 4 can rotate with the column 20. a connecting pin hole 52 is disposed radially at the lower end of the seat tube plug 5; a connecting hole 211 is disposed on the sleeve 21, the seat tube plug 5 is positioned to the sleeve 21 by passing a limiting pin 6 through the connecting hole 211 and the connecting pin hole 52; an extension portion resisted against the lower end of the rotary block 4 for limiting is disposed at the outer end of the limiting pin 6; and the rotary block 4 is rotatably sleeved on the sleeve 21 and is limited between the limiting pin 6 and the flange 51 of the seat tube plug 5. Two mounting plates 11 for mounting the pedal 31 are disposed on the upper end of the rotary base 1, and one mounting hole 111 is disposed close the outer ends of each mounting plate 11; two connecting lugs 311 matched with the mounting plates 11 are disposed at the lower end of the pedal 31, and two inner and two outer connecting holes 312, 313 are disposed on the connecting lugs 311; the outer connecting holes 313 correspond to the mounting holes 111 of the mounting plates 11; the pedal 31 is capable of being rotatably mounted on the rotary base 1 by passing a rotating shaft 8 through the mounting holes 111 of the mounting plates 11 and the outer connecting holes 313 of the connecting lugs 311. A through hole for receiving the pedal shaft 32 is longitudinally formed at a position, close to the inner side, in the middle of the rotary base 1 between the two mounting plates 11; a pin hole 321 is radially disposed at the upper end of the pedal shaft 311; the upper end of the pedal shaft 32 is inserted between the two connecting lug 311 of the pedal 31, and has a certain distance to the bottom of the pedal 31; the upper end of the pedal shaft 32 is connected to the connecting lugs 311 by passing a cylindrical pin 9 through the inner connecting hole 312 of the connecting lug 311, the pin hole 321 and the connecting hole 312 of the connecting lug 311 on the other side; the plurality of positioning holes 221 corresponding to the through hole of the rotary base 1 for receiving and positioning the lower end of the pedal shaft 32 are annularly disposed at intervals on the base plate 22 close to the outer edge; and when the pedal 31 is stepped down, the pedal shaft 32 is driven by the pedal 31 to move up to disengage from the positioning hole 221, and the rotary base 1 can rotate freely. A spring member capable of resetting the pedal 31 is disposed between the pedal 31 and the rotary base 1. The spring member is a torsion spring 7, the torsion spring 7 is sleeved on the rotating shaft 8; and one end of the torsion spring 7 is supported onto the upper end face of the rotary base 1, while the other end thereof is supported onto the rear end of the bottom of the pedal 31. In this way, the petal 31 has a trend to rotate upward all the time so that the pedal shaft 32 is inserted into the positioning hole 221 of the base plate 22. In order to limit the rotation of the pedal 31, a bent portion 314 bent downward is disposed at the inner end of the pedal 31; when the pedal 31 is reset, the bent portion 314 is resisted against the upper end face of the rotary base 1, a protruded portion 315 corresponding to the upper end of the pedal shaft 32 is disposed on the lower end face of the pedal 31; when the pedal 31 is stepped down and the pedal shaft 32 is moved upward to disengage from the base plate 22, the protruded portion 315 is resisted against the upper end of the pedal shaft 32, so as to limit the pedal 31 when the pedal 31 is stepped down to the largest extent.

Figure 3:
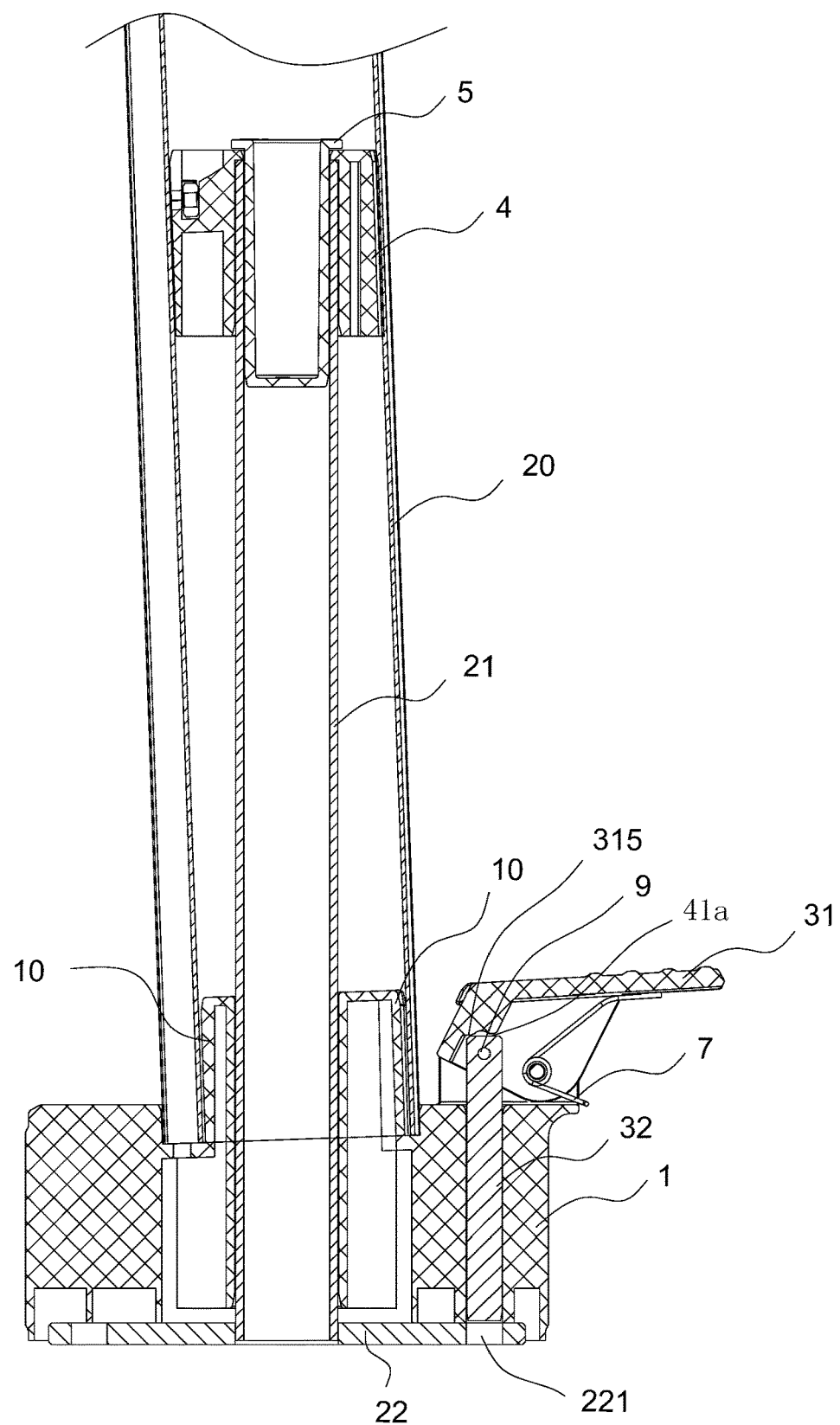
FIG. 3 is a sectional view of FIG. 1 when the pedal is stepped down.

When it is necessary to rotate the seat, the pedal 31 is stepped down, and the cylindrical pin 9 drives the petal shaft 32 to move upward to disengage from the base plate 22 of the sleeve welding piece 2. As shown in FIG. 3, after the pedal 31 is stepped down, the protruded portion 315 on the inner side comes into contact with the upper surface of the pedal shaft 32, and the pedal 31 is stepped down to the largest extent. The boss 10 of the rotary base 1 has the same shape as the rotary block 4, and the external column 20 is sleeved on both the rotary base 1 and the rotary block 4. Thus, by rotating the pedal 31 left and right, the rotation of the rotary base 1 can be realized, thereby driving the rotation of the external column 20.

Figure 4:
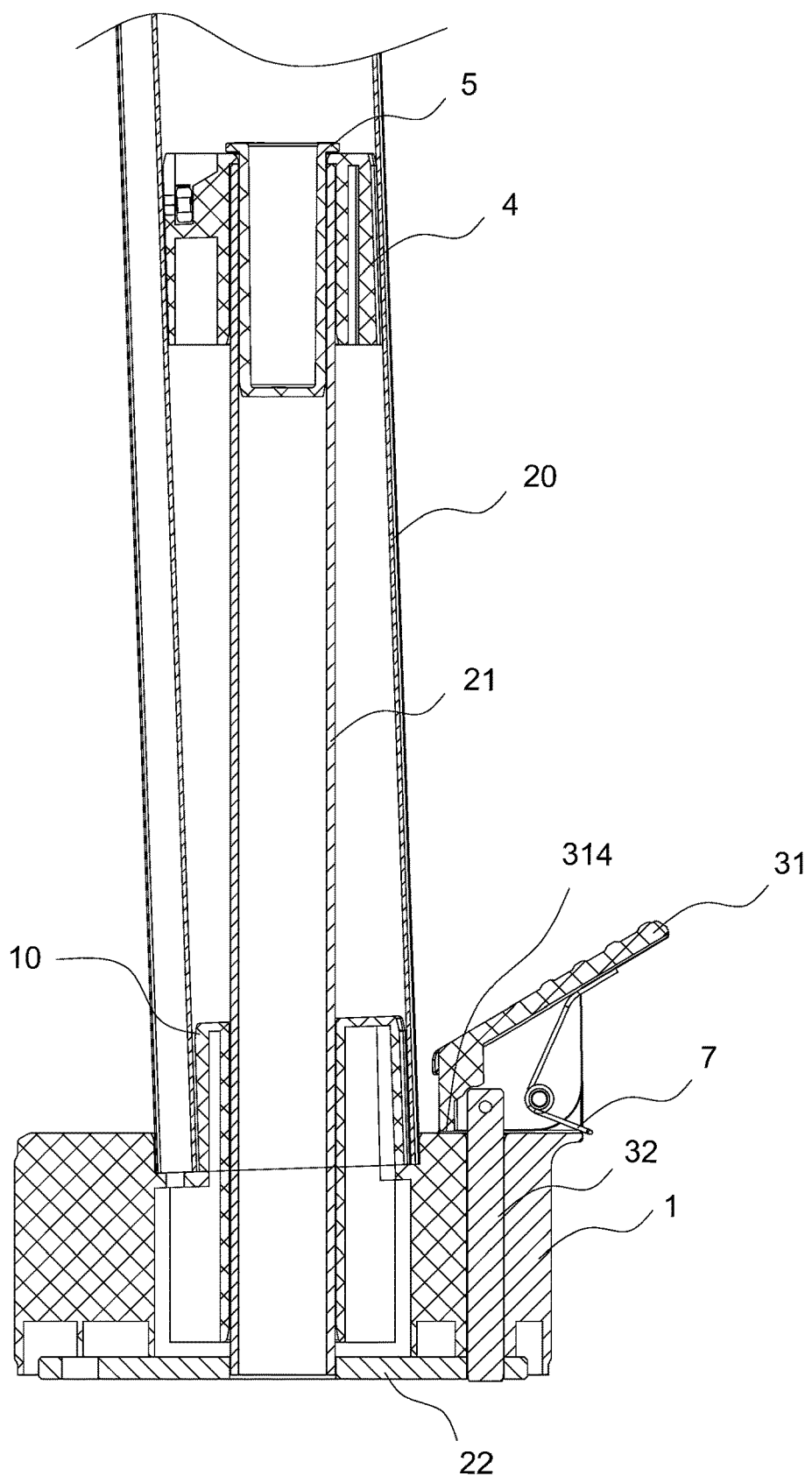
FIG. 4 is a sectional view of FIG. 1 when the pedal is not stepped down.

After the rotary base 1 is rotated in place, the pedal 31 is released. The pedal 31 is reset due to the action of the torsion spring 7, and the pedal shaft 32 is moved down to be inserted into the positioning hole 221 of the base plate 22. The bent portion 314 at the front end of the pedal 31 is resisted against the upper surface of the rotary base 1 to position and lock the seat, as shown in FIG. 4.

The protection scope of the present invention is not limited to each embodiments described in this description. Any changes and replacements made on the basis of the scope of the present invention patent and of the description shall be included in the scope of the present invention patent.

The invention claimed is:

1. A rotary umbrella seat for an umbrella, comprising:
a rotary base;
a sleeve welding piece fitted through the rotary base; and
a pedal component attached to the rotary base;
wherein,
the sleeve welding piece comprises a sleeve connected to a base plate;
the sleeve is vertically post disposed in the middle of the base plate;
the rotary base is sleeved outside the sleeve and located above the base plate, the rotary base is a circular base with a hole formed in a center of the rotary base and has a cylindrical boss formed at the hole;
a lower end of a column of the umbrella is slid over the sleeve and rest on the rotary base;
the pedal component comprises a pedal connected to a pedal shaft;
the pedal is resetably and rotatably attached to the top of the rotary base;
the base plate has a plurality of positioning holes, the pedal shaft passes through the rotary base and is inserted into one of the positioning holes on the base plate, the pedal shaft is disengaged from the base plate when the pedal is pressed down during the rotation of the pedal, the pedal shaft is engaged to the rotary base when the pedal is released;
a lower end of the sleeve passes through an inner hole of the boss and is fixed to the base plate;
a seat tube plug is disposed at the opening position on a top of the sleeve, and a rotary block is sleeved on an upper end of the sleeve; and
the rotary block rotates with the column, and is rotatably sleeved on the upper end of the sleeve and is covered by the seat tube plug.

2. The umbrella seat of claim 1, wherein the seat tube plug is a cylindrical structure matched with the inner hole of the sleeve;
a flange resisted against the upper end face of the sleeve is disposed at the upper end of the seat tube plug, and a connecting pin hole is disposed radially at the lower end of the seat tube plug;
a connecting hole is disposed on the sleeve, the seat tube plug is positioned to the sleeve by passing a limiting pin through the connecting hole and the connecting pin hole;
an extension portion resisted against the lower end of the rotary block for limiting is disposed at the outer end of the limiting pin; and
the rotary block is rotatably sleeved on the sleeve and is limited between the limiting pin and the flange of the seat tube plug.

3. The umbrella seat of claim 1, wherein two mounting plates for mounting the pedal are disposed on the upper end of the rotary base, and one mounting hole is disposed close the outer ends of each mounting plate;
two connecting lugs matched with the mounting plates are disposed at the lower end of the pedal, and two inner and two outer connecting holes are disposed on the connecting lugs;
the outer connecting holes correspond to the mounting holes of the mounting plates;
the pedal is capable of being rotatably mounted on the rotary base by passing a rotating shaft through the mounting holes of the mounting plates and the outer connecting holes of the connecting lugs; and
a spring member capable of resetting the pedal is disposed between the pedal and the rotary base.

4. The umbrella seat of claim 3, wherein a through hole for receiving the pedal shaft is longitudinally formed at a position, close to the inner side, in the middle of the rotary base between the two mounting plates;
a pin hole is radially disposed at the upper end of the pedal shaft;
the upper end of the pedal shaft is inserted between the two connecting lugs of the pedal, and has a certain distance to the bottom of the pedal;
the upper end of the pedal shaft is connected to the connecting lugs by passing a cylindrical pin through the inner connecting hole of the connecting lug, the pin hole and the connecting hole of the connecting lug on the other side;
the plurality of positioning holes corresponding to the through hole of the rotary base for receiving and positioning the lower end of the pedal shaft are annularly disposed at intervals on the base plate close to the outer edge; and
when the pedal is stepped down, the pedal shaft is driven by the pedal to move up to disengage from the positioning hole, and the rotary base can rotate freely.

5. The umbrella seat of claim 4, wherein the spring member is a torsion spring, the torsion spring is sleeved on the rotating shaft; and one end of the torsion spring is supported onto the upper end face of the rotary base, while the other end thereof is supported onto the rear end of the bottom of the pedal.

6. The umbrella seat of claim 5, wherein a bent portion bent downward is disposed at the inner end of the pedal;

when the pedal is reset, the bent portion is resisted against the upper end face of the rotary base, a protruded portion corresponding to the upper end of the pedal shaft is disposed on the lower end face of the pedal;

when the pedal is stepped down and the pedal shaft is moved upward to disengage from the base plate, the protruded portion is resisted against the upper end of the pedal shaft, so as to limit the pedal when the pedal is stepped down to the largest extent.

7. The umbrella seat of claim 1, wherein a groove for receiving the column is disposed on the rotary base along the outer side of the boss, the column is sleeved outside both the boss and the rotary block;

the lower end of the column is inserted into the groove of the rotary base for positioning;

the boss has the same shape as the rotary block, and a plurality of positioning guide ribs matched with the inner wall of the column are disposed on the outer circumferential surfaces of the boss and the rotary block.

8. The umbrella seat of claim 1, wherein the sleeve is welded to the base plate.

* * * * *